United States Patent [19]

Kunz

[11] 4,362,412

[45] Dec. 7, 1982

[54] COUPLING FOR REMOVABLY CONNECTING A ROD TO A DRIVING SHAFT

[75] Inventor: Wolfgang Kunz, Lörrach-Hauingen, Fed. Rep. of Germany

[73] Assignee: Firma Kunz Maschinen-U. Apparatebau GmbH, Lörrach-Hauingen, Fed. Rep. of Germany

[21] Appl. No.: 178,705

[22] Filed: Aug. 12, 1980

[30] Foreign Application Priority Data

Aug. 14, 1979 [DE] Fed. Rep. of Germany ....... 2932895

[51] Int. Cl.³ .......................... B25G 3/00; F16D 1/00; F16G 11/00
[52] U.S. Cl. ...................................... 403/11; 403/361
[58] Field of Search .................. 403/11, 12, 361, 383, 403/253, 256, 263; 285/16, 17; 64/7 R, 11 F

[56] References Cited

U.S. PATENT DOCUMENTS

| 3,217,515 | 11/1965 | Benson | 64/7 |
|---|---|---|---|
| 3,469,416 | 9/1969 | Snyder | 64/7 |
| 3,698,748 | 10/1972 | Petri | 403/361 X |
| 3,707,303 | 12/1972 | Petri | 403/361 X |
| 4,031,830 | 6/1977 | Hirt et al. | 403/11 X |
| 4,064,708 | 12/1977 | Breads | 403/369 X |
| 4,305,678 | 12/1981 | Majoor | 403/361 |

Primary Examiner—Wayne L. Shedd
Attorney, Agent, or Firm—Michael J. Striker

[57] ABSTRACT

The coupling for connecting a winding rod for a roll of web material to a driver shaft, includes a tenon-like end portion of the rod and a matching socket formed at the end of the driver shaft; exchangeable wearing plates are inserted in between the flat coupling surfaces of the end portion and the socket or the socket snugly accommodates a one-piece wearing insert defining a recess for engaging the end portion of the rod.

23 Claims, 6 Drawing Figures

1

COUPLING FOR REMOVABLY CONNECTING A ROD TO A DRIVING SHAFT

BACKGROUND OF THE INVENTION

The present invention relates in general to a coupling, and in particular to a coupling for removably connecting a rod such as for example a winding core for a roll of a web-like material to a driving shaft in a roll processing machine whereby the end portion of the rod has a noncircular cross section provided with a longitudinally directed flat surface and being insertable into a coupling socket formed on the face of the driving shaft and having a contour of its inner wall complementary to the cross section of the noncircular end portion.

In textile and paper processing industries a web-like material is usually wound up on winding rods to form rolls of fabric or of a paper web. In processing such web rolls a device is known from the German patent 917,552 including a so-called tilting bearing having a coupling socket for which a relatively large tolerance is necessary. This large tolerance of the coupling socket is required due to the fact that a plurality of different winding rods has to be applied always to the same driving shaft of the machine and consequently the tolerance is defined by the largest and the least accurate coupling end of the winding rod. For this reason, however, in transferring rotary moments from the driving shaft the rod is subject to additional movements and to a corresponding wear. In addition, the shape of the tilting or snap bearing always sets limits to the applicability of a particular coupling end of the winding rods.

SUMMARY OF THE INVENTION

It is therefore a general object of the present invention to overcome the aforementioned disadvantages.

More particularly, it is an object of the invention to provide an improved coupling of the aforedescribed type which maintains a fast exchangeability of different winding rods while eliminating the disadvantageous effects of the wear in prior art couplings.

An additional object of the invention is to provide such an improved coupling which has an increased working life.

In keeping with these objects, and others which will become apparent hereafter, one feature of the invention resides in a coupling of the aforedescribed type, in the provision of at least one exchangeable wearing piece which is snugly fitted between the flat coupling surface on the end portion of the winding rod and the corresponding flat inner wall of the socket on the driving shaft. The rotary moment is transmitted through this wearing piece which after a certain period of time can be exchanged without difficulties. The contour of the snap bearing or socket thus remains uneffected so that the working time of the snap bearing is practically unlimited. Moreover, the wearing piece can have a configuration which changes the contour of the inner walls of the socket and consequently rods having different end coupling portions both in shape and/or in size can be accommodated to a given inner contour of the socket. As a consequence, the applicability and operational diversity of the coupling of this invention is considerably increased with respect to prior art couplings of this type.

In the preferred embodiment of this invention, the end portion of the rod is formed with two opposite flat surfaces arranged parallel and symmetrically to the axis of the rod and each being in engagement with an exchangeable wearing part such as the wearing plate and the like. The front surfaces are formed by milling, for example. The remaining peripheral portions of the end part of the rod between the flat surface are used for centering the rod in the coupling socket so that the insertion of the rod into the coupling snap bearing or socket is very simple and fast and consequently the tolerances of the socket can be correspondingly reduced. The manufacturing of the recessed inner walls of the coupling socket is also simple inasmuch as in the case of a rounded contour of the coupling end portion they can be made also round and the matching to the flat surface on the end portion of the rod can be accomplished by a corresponding shaping of the wearing plates, namely by providing a round outer surface and a flat inner surface of each plate. In this case the wearing plates serve not only for taking over the wear resulting during the working time of the coupling, but also for simplifying the manufacture and the shape of the coupling socket while maintaining the possibility to match the same with any shape of the coupling end of the rod.

Preferably, the wearing piece or plate is releasably connected to the coupling socket in such a manner that an easy insertion of the coupling end into the socket is maintained. This releasable connection still ensures a fast and problem-free exchange of the wearing plates in the event of a repair or when a modification of the contour of the coupling surfaces is required.

When the coupling socket is in the form of a tilting or snap bearing, the wearing pieces or plates are disconnectably attached to the inner wall of the bearing at right angles to the open side. The symmetrical arrangement of two opposite wearing plates at opposite inner walls of the bearing or socket guarantees simultaneously a satisfactory balancing of the rotary parts. It is also possible to provide an additional wearing piece such as a wearing plate, pad and the like on the bottom wall of the socket or snap bearing, or also on the detachable part of the bearing closing the open side. These additional wearing pieces are also removably attached to the assigned walls. In this manner, the entire coupling surface in the bearing or socket can be aligned with wearing plates.

In another preferred embodiment of this invention, the whole wearing piece is shaped to have a complementary contour relative to the flattened end part of the rod and is inserted and removably attached as a whole into the coupling bearing or socket. In this manner, it is no longer necessary to provide the juxtaposed flat surfaces of the coupling with separate wearing plates. Even this one piece wearing insert is easy to manufacture and still easier to exchange when after a working time it becomes worn out. Furthermore, this one piece embodiment of the wearing insert has the advantageous feature that the shape of the coupling recess in the insert can be arbitrarily modified so that wearing pieces of different inner contours but with a uniform outer contour are applicable. For example, it is possible to make the coupling recess in the wearing body in the form of a triangle having its apex directed to the bottom of the insert or in the form of a rectangle which is oriented with one side thereof parallel to the bottom of the insert or having directed one edge to the bottom wall. In still another modification, the contour of the coupling end portion of the rod and the corresponding recess in the one piece wearing insert has the shape of a square or of a regular polygon whereby the tiltable hand-operated closure part of the socket forms at least one side of the polygon. A triangular or rectangular cross section oriented with its edge toward the bottom of the wearing piece enables a very fast exchange of the winding rod whereas a rectangle oriented with one of its sides parallel to the bottom wall of the socket has a particularly good force transmitting quality.

The one piece wearing insert with its coupling recess can be attached in its coupling socket on the driving shaft by means of coaxial pins, screws and the like whereby its outer contour is circular and coaxial with the driving shaft. The bearing or socket on the face of the driving shaft can be also very easily manufactured because the circular contours are easy to be turned or milled. The driving shaft can be provided with a coaxial mounting flange with added holes for screws or bolts whereby the single piece wearing insert is attached by the screws or bolts to the flange. The single piece wearing insert can be also disconnectably attached to the tilting or hinged closure part of the bearing or socket, whereby the recess in this part has the form of a circular section matching the outer periphery of the wearing insert. This modification also facilitates the manufacturing and assembly of the recessed parts of the coupling.

In a further elaboration of this invention, the durability of the wearing body or insert is increased and the generation of noises in the coupling socket is reduced by the provision of a damping element projecting through an opening made in at least one of the wearing plates or wearing surfaces and overlapping the same at least about the amount of the play between the end portion of the rod and the coupling socket. Preferably, each wearing plate or surface is provided with a slightly projecting damping element. The wearing parts are made for example of hardened steel whereas the assigned damping elements are with advantage made of a hard wear-resistant plastic, such as, for example, polyurethane.

To match the coupling surface of the socket to the coupling end portions of different winding rods differing either in thickness or in profile, it is of advantage when a plurality of correspondingly different one-piece wearing units or wearing plates are provided for each applicable winding bar so that the user can establish the coupling particularly for an arbitrary winding rod.

The novel features which are considered as characteristic for the invention are set forth in particular in the appended claims. The invention itself, however, both as to its construction and its method of operation, together with additional objects and advantages thereof, will be best understood from the following description or specific embodiments when read in connection with the accompanying drawing.

DESCRIPTION OF THE PREFERRED EMBODIMENTS

Figure 1:
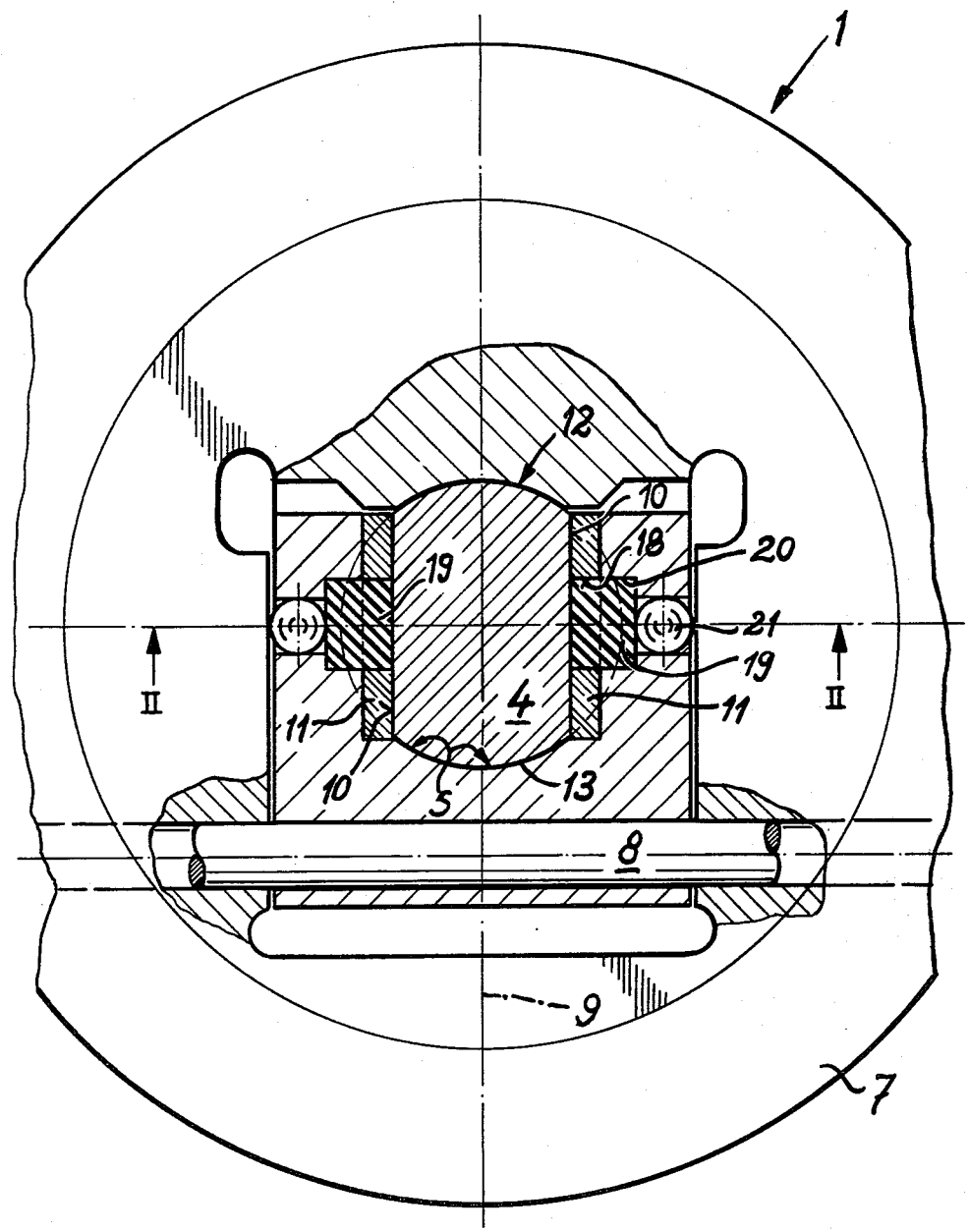
FIG. 1 is a front sectional view of a coupling of this invention for a winding rod and a driving shaft in the form of a snap bearing whereby the end portion of the rod is formed with two opposite flat surfaces for transmitting the rotary moment.

The device designated by reference numeral 1 includes a coupling for connecting winding rod 2 to a driving shaft 3 whereby the coupling is constituted by the so-called tilting bearing or socket 6. The winding rod 2 serves for example for taking up or unrolling web-like paper or fabric material.

In the following examplary embodiments the coupling itself is constituted by a coupling pin or tenon 4 formed on the end portion of the rod 2 whereby the cross section of the coupling tenon 4 is different from a circle. The coupling socket 6 formed on the end face of the driving shaft 3 has a multi-side recess 5 matching the contour of the coupling tenon 4. One lateral side of the socket 6 is open so that the coupling tenon 4 can be inserted or removed from the socket 5. For lifting the loaded rod from the coupling socket 6, a hand wheel 7 is supported for a tilting movement about an axle 8 away from the socket 6 and against the driving shaft so that the coupling end 4 of the rod 2 is released upwardly.

According to this invention, at least one exchangeable wearing piece 11 is fitted between the facing flat surfaces of the coupling pin 4 and the recess 5 of the socket 6; the wearing pieces 11 are shaped according to different configurations of the coupling recess 5 and of the coupling pin 4 and are exchangeable.

Figure 2:
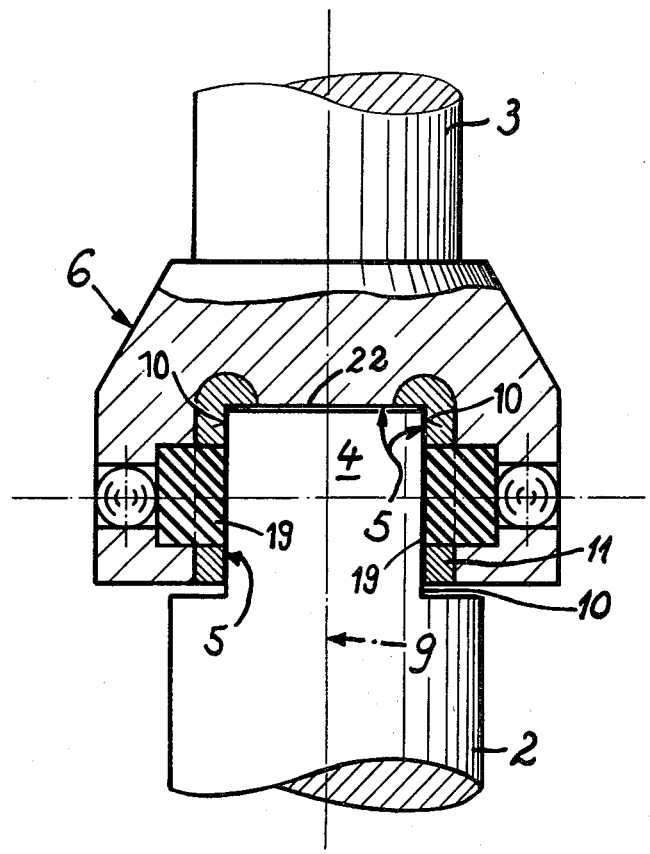
FIG. 2 is a side view partly in section of the coupling of FIG. 1.

In the embodiment according to FIGS. 1 and 2 the coupling tenon or pin 4 is formed with two opposite flat surfaces 10 symmetrically arranged with respect to a circuit plane 9 of the pin 4; the flat surfaces are made for example by milling or the like and constitute the coupling surfaces of the rod 2. In this embodiment, where the coupling surfaces are plan-parallel, each wearing piece has the form of a wearing plate 11. In this embodiment, the wearing plates 11 have a rectangular form and are directed at right angles to the open side 12 of the tilting socket 6. As seen from FIG. 1, the contour of the recess 5 in the socket 6 is made with a certain tolerance with respect to the plan parallel coupling surfaces 10 of the coupling pin 4 whereby the rounded intermediate surface 13 between the flat walls of the recess 5 matches the cylindrical jacket section on the coupling pin 4. The rounded cylindrical section 13 is symmetrical with respect to the central plane 9 and thus ensures in cooperation with the wearing plates 11 a simple and very accurate centering of the winding rod with respect to the driving shaft. Accordingly, the symmetrical arrangement in the coupling of this invention ensures not only a good transmission of the rotary moment of the shaft, but also simultaneously a precise alignment of the center axis of the rod and of the driving shaft. Any vibration or shocks exerted on the coupling fed surfaces due to any unavoidable tolerances are intercepted by the wearing plates 11 which after a certain time of use can be exchanged for new ones.

A modified embodiment of this invention is illustrated in FIGS. 3 to 6. In this embodiment, the tiltable hand wheel 7 also supports the closure part 12 of the coupling socket 6 which has the form of a cylindrical shell for receiving a one-piece wearing insert 14 which is formed with a recess 15 matching the contour of the coupling pin 4 on the winding rod 2. The periphery of the one-piece wearing insert 14 snugly fits the cylindrical inner wall of the socket 6 so that the insert can be easily introduced or withdrawn from the socket.

The inner walls of the recess 15 which in this example have a triangular configuration transfer the rotary moment in the coupling and are therefore subject to wear. Accordingly, after a certain period of operational time the whole one-piece insert 14 is replaced for a new one. In the case of a one-piece wearing insert, the contour of its recess matches the contour of the coupling pin 4. It is necessary therefore that in order to enable the use of winding rods having a different size or configuration of its coupling pin 4 to keep in stock corresponding wearing inserts having different recesses matching the different contours of these rods. In the example according to FIGS. 3 to 6, the single piece wearing insert 14 is secured to the socket by means of axially directed pins or screws 16 distributed on a circle concentric to the axis of rotation of the rod 2 or the shaft 3. Due to the uniform cylindrical inner wall of the coupling socket 6, it is possible to fasten therein standard wearing inserts 14 differing only in the configuration and size of its recess 15. It is therefore possible to replace the insert 14 shown in the example of FIG. 3 for the insert of FIG. 5.

A complementary part 17 to the cylindrical section of the wearing insert 14 is releasably secured inside the closure part 12 to the hand-operated tiltable wheel 7. By placing the wheel in its upright position the closure 12 with its insert 17 closes the open side of the recess 15 in the wearing insert 14 and holds reliably the coupling pin 4 in its working position. Upon replacing the one-piece wearing insert 14, the complementary part 17 remains attached to the wheel 7.

It is evident that the shape of the coupling recess 15 in the wearing insert 14 may also differ from the illustrated triangular one directed with its edge toward the bottom of the coupling socket 6; instead, the recess 15 can also have the shape of a quadrangle such as a square and the like or a regular polygon whereby the tiltable hand operated wheel 7 in its closing position forms at least one side of such a polygon. The cross section of the coupling pin 4 has to match the inner contour of the recesses in the parts 14 and 17 of the wearing insert. The polygonal cross sections can be also combined with rounded sides similarly as in the embodiment of FIG. 1.

Figure 3:
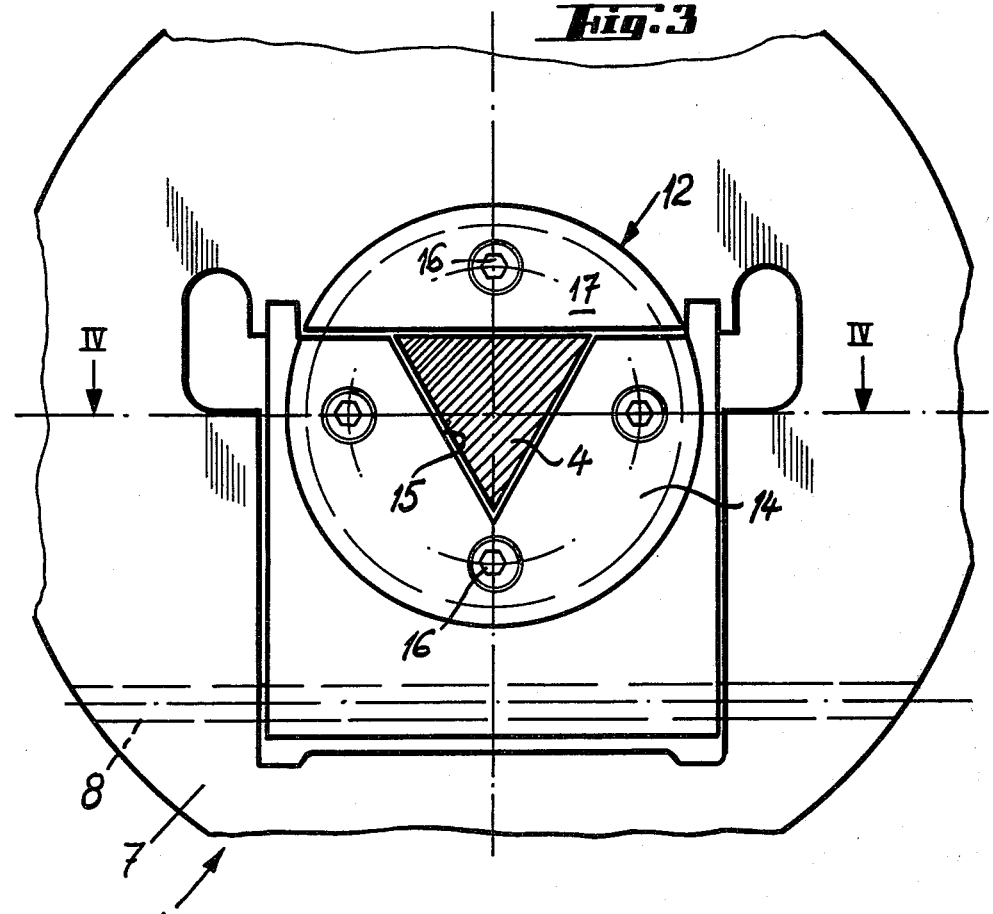
FIG. 3 is a front view partly in section of another embodiment of the coupling of this invention showing a coupling and of the rod having a triangular cross section.
Figure 4:
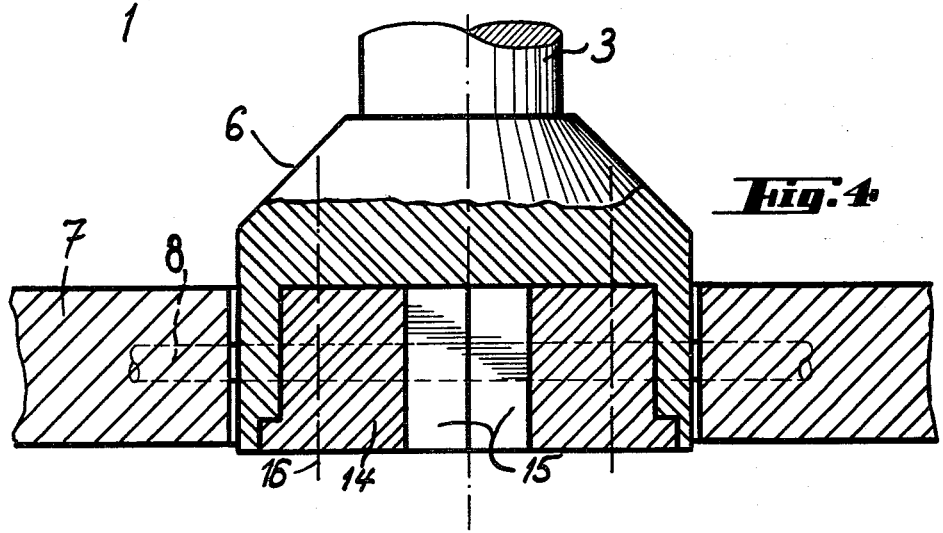
FIG. 4 is a side view partly in section of a snap bearing or socket in the coupling of FIG. 3.
Figure 5:
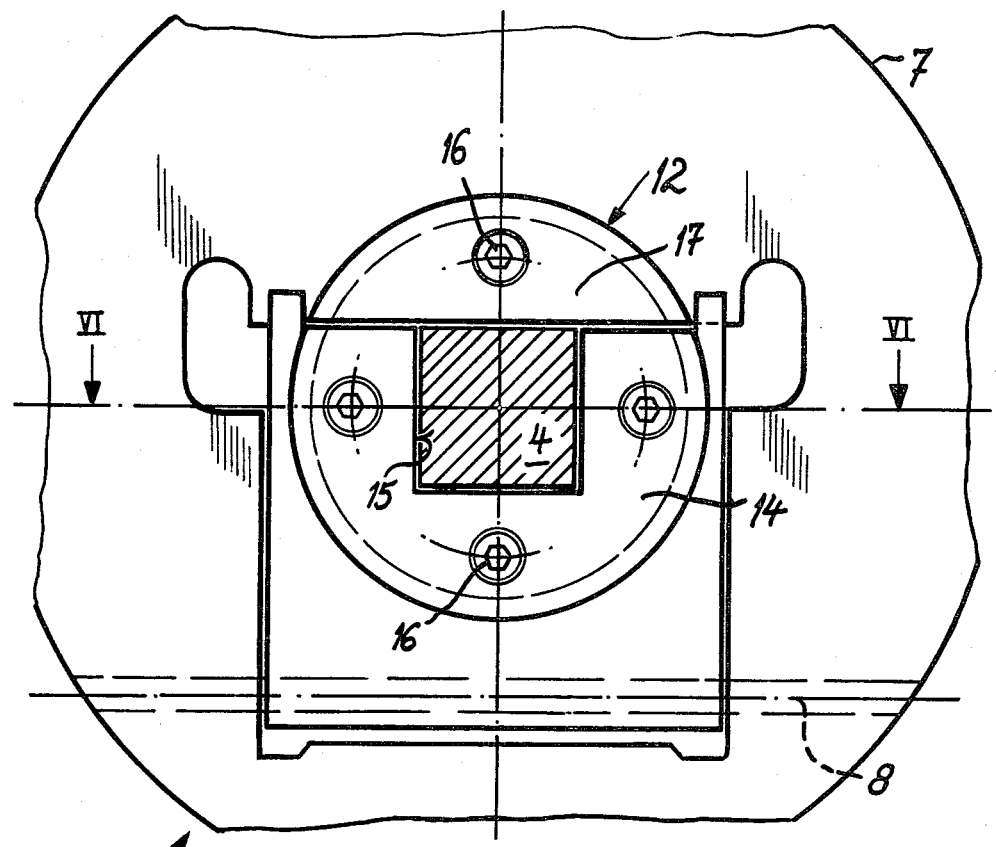
FIG. 5 is an embodiment similar to FIG. 3 for a coupling end portion of the winding rod having a square cross section.
Figure 6:
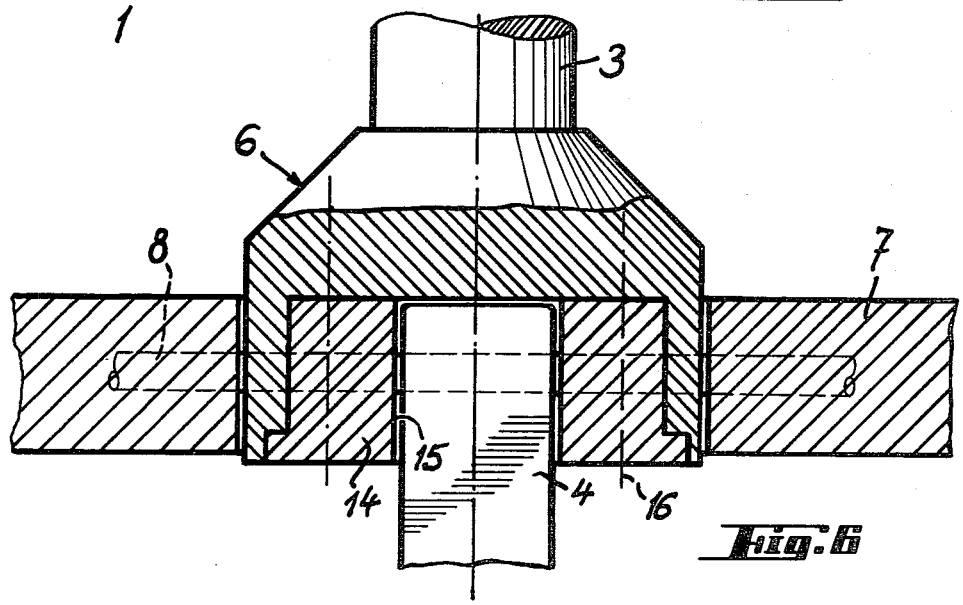
FIG. 6 is an axial cross section of the embodiment of FIG. 5.

In the embodiment according to FIG. 3 employing a triangular cross section of the coupling pin 4, the insertion is particularly simple and time-saving whereas in the embodiment of FIG. 5 employing a quadangular cross section of the coupling pin an increased rotary moment can be transmitted.

Referring again to the embodiment according to FIGS. 1 and 2, there is illustrated a feature which can be used also in a similar manner in the remaining embodiments. This feature includes at least one damping element 19 which projects through an opening 18 in each of the wearing plates 11 whereby the thickness of the damping element exceeds the tolerance between the flat surfaces of the coupling pin 4 and of the recess 5. The damping element 19 has a certain elasticity and therefore damps the vibrations which might result due to a minute backlash resulting between the coupling surfaces. This backlash and the corresponding overlapping part of the damping element 19 is so minute that it is not observable in the drawing. In the other embodiments of this invention employing a single piece wearing insert, each coupling flat surface could be provided with a similar damping element. These damping elements can be manufactured for example of a hard wearing free plastic material such as polyurethane whereas the material of the wearing pieces 11 and 14 as mentioned before is of a tempered steel.

Preferably, the opening 18 in the wearing plates 11 are aligned with recesses 20 of the same diameter in the coupling socket 6. The recesses 20 further communicate with a through bore of a smaller diameter of which control balls 21 are located. These control balls project slightly above the outer surface of the socket 6 and upon tilting the wheel 7 about the axle 8 into its closing position of the socket 6 the balls are displaced inwardly and compress the damping elements 19 against the coupling surfaces 10 of the pin 4. By these means it is attained that when the tilting bearing or socket 6 is open, no pressure is exerted by the pressure elements 21 against the damping elements and thus against the coupling pin 4 so that the removal of the winding rod or its insertion into the coupling recess 5 can be made without any resistance while when the wheel 7 is tilted into its closing position the coupling pin 4 is symmetrically squeezed between the damping elements so that the minute tolerances between the wearing plates 11 and the possible vibrational noises are reduced.

As depicted in FIG. 2, the wearing plates 11 project partially into grooves formed in the edges of the bottom wall 12 and are positively attached therein. It is also possible to use also sunk screws for mounting the wearing plates 11.

In summary, especially when a one-piece wearing insert 14 in a cylindrical socket sleeve is used, a simplified structure and manufacture of the entire tiltable coupling bearing will result while the manufacturing tolerances and thus the wearing of the insert itself is substantially reduced. Moreover, the exchange of the old wearing insert either in the case of an excessive wear or when a different contour of the coupling pin is to be used is fast and easy. Particularly when a triangular cross section of the coupling pin is used a wear caused by the discontinued discharge is practically impossible. This problem does not occur in wearing sleeves which are produced independently from the coupling socket. Similarly, the other types of the one piece wearing inserts can be produced simultaneously with their coupling sockets.

It will be understood that each of the elements described above, or two or more together, may also find a useful application in other types of constructions differing from the types described above.

While the invention has been illustrated and described as embodied in a coupling for use with winding machines, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A coupling for releasably connecting a rod to a driving shaft, comprising at least one flat surface on a peripheral end portion of said rod; a coupling socket attached to the face of the driving shaft, said socket having an open lateral side for receiving said one end portion of the rod and at least one flat inner wall matching the flat surface of said portion; and an exchangeable wearing piece fitting between the flat inner wall and the flat surface to transfer rotary moment from said shaft to said rod.

2. A coupling as defined in claim 1, wherein said rod is a winding core of a roll processed on a machine including said driving shaft.

3. A coupling as defined in claim 1, wherein said end portion of said rod is formed with two opposite flat surfaces arranged symmetrically with respect to a central plane of the rod and said wearing piece including two wearing plates inserted between said flat surfaces and the corresponding inner walls of said socket.

4. A coupling as defined in claim 1, wherein said wearing piece is a one-piece removable receptacle matching the inner wall of said socket and including a recess for removably accommodating said coupling end portion of said rod.

5. A coupling as defined in claim 4, wherein said one-piece insert is secured to said socket by removable fastening means.

6. A coupling as defined in claim 1, wherein said socket is in the form of a tilting two-piece bearing defining an openable lateral side.

7. A coupling as defined in claim 6, wherein said wearing pieces are wearing plates insertable into said socket at right angles to the plane of said open side.

8. A coupling as defined in claim 6, wherein said socket has a cylindrical configuration and said wearing piece is a two-piece cylindrical inlet defining in one piece a recess for said coupling end part of said rod and the second piece closing said one piece.

9. A coupling as defined in claim 8, wherein said pieces of said wearing insert are secured by removable fastening means to the assigned pieces of said tilting bearing.

10. A coupling as defined in claim 1, wherein said wearing piece is formed with an opening extending between said flat inner wall and said flat surface, and further including a damping element arranged in said opening and exceeding the surfaces of said wearing plate.

11. A coupling as defined in claim 3, wherein each of said wearing plates is provided with a damping element projecting above the surface of the assigned plate.

12. A coupling as defined in claim 1, further including additional wearing pieces each having a different contour or thickness to adjust different configuration of the end pieces of said rods.

13. A coupling as defined in claim 1, wherein said wearing piece is made of hardened steel.

14. A coupling as defined in claim 4, wherein said damping element is made of a hard abrasion-resistant plastic material such as polyurethane.

15. A coupling as defined in claim 6, wherein the bottom wall of said socket is provided with retaining grooves snugly fitting the edges of said wearing plates.

16. A coupling as defined in claim 10, wherein said socket is formed with a stepped recess being in alignment with said opening in said wearing plate to accommodate a part of said damping element and further being formed with a through-going passage communicating with the bottom wall of said stepped recess for accommodating a movable pressure member which in the coupling position of the end piece of said rod compresses said damping element against said flat surface.

17. A coupling as defined in claim 16, wherein said socket includes a tiltable closure part for closing said open lateral side, said closure part having portions extending in the range of said through-going passage and being operable for urging said pressure member against said damping element when said tiltable closure part is in its closing position.

18. A coupling as defined in claim 17, wherein said pressure element is a ball.

19. A coupling as defined in claim 3, wherein said rod has a cylindrical cross section and said socket defining between its two opposite flat walls a matching cylindrical wall to center said coupling end portion.

20. A coupling as defined in claim 8, wherein said wearing insert is attached to said socket by axially directed pins, screws and the like.

21. A coupling as defined in claim 6, wherein said tilting bearing is formed of a socket part attached to the face of said driving shaft and a tilting handoperated wheel hinged to said socket part and supporting a closure part for closing the open lateral side of said socket part.

22. A coupling as defined in claim 21, wherein said socket part and said closure part form together a cylindrical shell.

23. A coupling as defined in claim 22, wherein said wearing piece has a cylindrical configuration matching the interior of said cylindrical shell and being constituted by a closure piece and a socket piece, said socket piece defining a polygonal recess for receiving a corresponding end part of said rod and said closure piece delimiting removably said open lateral side of said recess.

* * * * *